Kenneth F. Becker,
Inventor.
Koenig and Pope,
Attorneys.

United States Patent Office 3,159,251
Patented Dec. 1, 1964

3,159,251
FLEXIBLE CORNER MOLDING FOR
CURVED SURFACES
Kenneth F. Becker, Hanley Hills, Mo.
(7701 Underhill Drive, St. Louis 14, Mo.)
Filed Apr. 24, 1961, Ser. No. 105,037
4 Claims. (Cl. 189—85)

This invention relates to corner moldings for supporting ceiling members, and more particularly, for such moldings for supporting acoustical and similar ceiling pans adjacent curved surfaces.

Among the several objects of the invention may be noted the provision of a corner molding for supporting ceiling members adjacent curved walls or columns and the like, which does not have to be preformed when delivered to the job; the provision of molding of the class described that may be delivered straight and manually bent to conform to the shape of a curved or other odd shaped surfaces; the provision of a molding of this class which retains a smooth and unbroken lower surface of good appearance, regardless of the shape to which the molding is bent; and the provision of a simplified molding of this class which is economical in construction and adapted conveniently to be prepared for use and application. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a perspective view illustrating a portion of one embodiment of a corner molding made according to the invention;

Corresponding reference characters indicate corresponding parts throughout the several views of the drawings.

Figure 2:
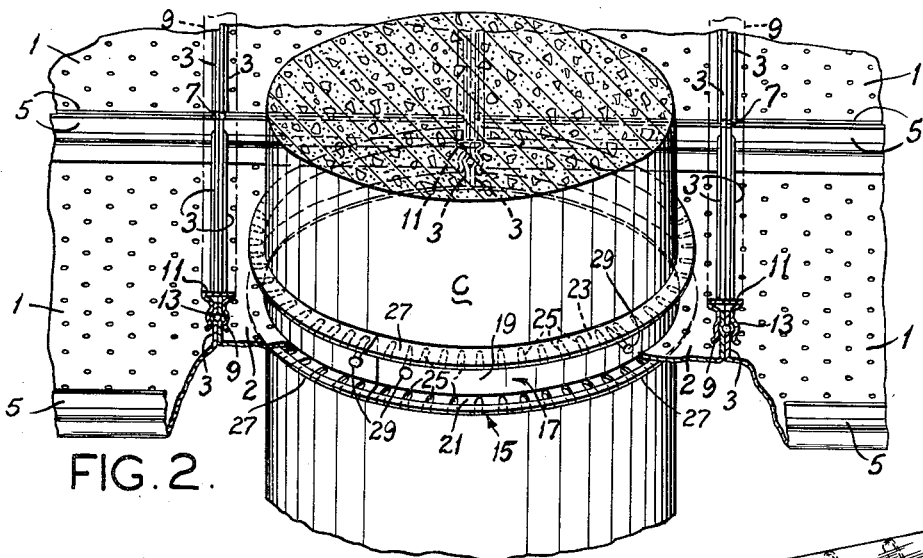
FIG. 2 is a perspective view of a portion of a partly constructed ceiling surrounding a column, illustrating application of said one embodiment of the invention.

There is known in the art acoustical ceiling material consisting of perforated metal pans, parts of which are shown at 1 in the drawings herein. The complete pans may for example be about 12" wide and 24" long. These pans usually contain soundproofing pads (not shown, but it will be understood that such pans are sometimes used without the pads. The pans may be unperforated, as is sometimes the practice in making up metallic ceilings without soundproofing. They have side flanges 3 and end flanges 5, separated at the corners by notches 7. The method of mounting these beneath a permanent ceiling (not shown) is, for example, to align and attach so-called T-runners 9 to spaced parallel members (not shown) which are attached to the permanent ceiling.

Each T-runner 9 comprises a top or base 11, with parallel downwardly extending springy side flanges 13 which are grooved and flared as can be seen in FIG. 2. These are for the springing reception of the side flanges 3. The latter are ribbed for snapping into the grooves of the side flanges 13. The end flanges 5 of the pans extend crosswise between the T-runners 9, the notches 7 accommodating the T-runners. Thus when the pan flanges 3 are snapped into the T-runners 9, as shown in FIG. 2, the flanges 5 extend crosswise and stiffen the pans 1, so that they present coplanar flat surfaces, providing a flat ceiling surface.

A preformed molding or channel is usually provided to fit the curvature of any columns in a room or convexly curved surfaces of the walls of the room in which the ceiling composed of the pans is being installed. These channels have heretofore been rolled of comparatively heavy metal and are relatively expensive. Poured columns such as shown at C in FIG. 2 do not usually come out exactly round and they even have a few flat surface portions on them. Similarly, other curved surfaces, such as curved walls, usually do not have the exact curvature specified in the construction plans of a room. This may be due, for example, to uneven plaster thickness, or other similar irregularities in the construction of the walls. Thus a preformed molding or channel may not have an exact fit with the convexly curved surface. My invention renders these preformed moldings or channels obsolete. After a molding or channel has been attached to a column, pans which are to surround the column need to be cut into fractional pans 2 and in such a shape as to conform to the general curvature of the column. The cut edges of the pans rest on the lower flange of the molding or channel member.

Figure 1:
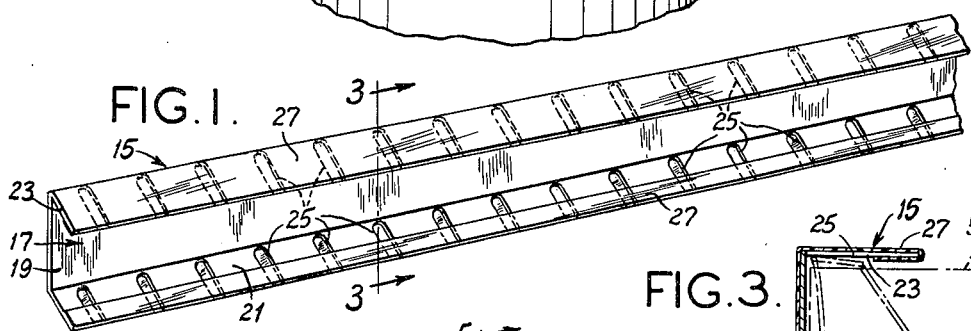
Figure 3:
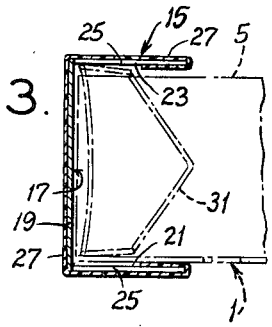
FIG. 3 is an enlarged cross section taken on line 3—3 of FIG. 1.

One embodiment of my new molding is shown in FIGS. 1–3 and is generally designated at 15. Referring to FIG. 1, the molding comprises a flexible elongated bracket 17 in the form of a channel having a flat back or web 19, a bottom flange 21 and a top flange 23. The channel 17 is constructed of a thin metal, for example, 26 gauge soft steel, which is manually flexible in comparatively short lengths. The flanges 21 and 23 are provided with a plurality of notches 25 which remove from the flanges 21 and 23 their stiffening effects on the web 17. These notches 25 extend from the outer edges of the flanges toward and to the flat back 19 and are spaced apart along the length of the channel.

Another way of describing the channel is to say that the flat back or web 19 has a plurality of tabs 22 separated by spaces (notches 25) which angle open when the molding is bent around a curved surface.

A thin lamination of plastic material 27 is adhered by any suitable adherent to at least the lower side of the repeatedly notched flange 21. Preferably, as shown in FIGS. 1–3, the plastic material is adhered to the channel from a point on the upper inside of the lower flange around the lower flange, the flat back 19, and the upper side of flange 23, to a point on the lower inside of flange 23. This forms a wrap which not only covers the notches 25 on their exposed sides but also the flange edges. The layer of plastic material is relatively thin, for example, .006", and is of a material that is resilient and stretchable, such as vinyl, neoprene, or other plastic materials with similar characteristics. The plastic sheet forms flexible and stretchable covering webs across the notches 25. The plastic may be of a color which corresponds or blends with the color of the pans, such as white, aluminum, etc. and is preferably opaque so as to render the notches invisible. The plastic material 27, being resilient, stretches across the notches 25, as they angle open when the channel is bent around a curved surface such as that of a column and make the flanges 21 and 23 look like continuous flanges instead of notched flanges.

Assuming, with respect to FIG. 2, that whole pans 1 have been located in the T-runners 9, fractional pans 2 are prepared by cutting them to conform to the general curvature of the column C. A length of molding equal to the circumference of the column is then cut from a long length of the molding. The ends are cut to form the desired joint, i.e., butt joint, lap joint, etc., when the channel is installed. The channel may then be bent around the column and nailed thereto with masonry nails 29, for example. The fractional pans are mounted in the ceiling structure with the appropriately curve-cut edges thereof resting on the lower flange 21. A spring clip 31 (suggested by dotted lines in FIG. 3), such as disclosed in my copending application Serial No. 829,572, filed on July 27, 1959, now U.S. Patent 3,038,572, for Pressure Clips for Ceiling Members in Corner Molding, may be used to hold the pans in the channel and against the lower flange thereof, so as to provide a close good-looking fit. This clip 31 is not illustrated in FIG. 2 because it would unduly complicate the figure.

Figure 4:
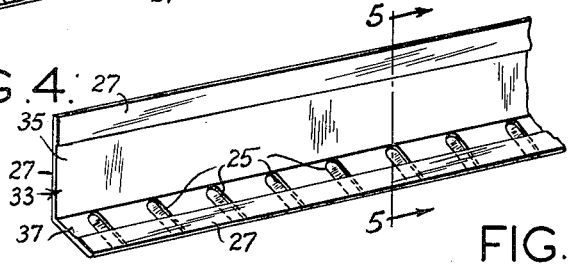
FIG. 4 is a perspective view of a portion of a second embodiment of this invention.
Figure 5:
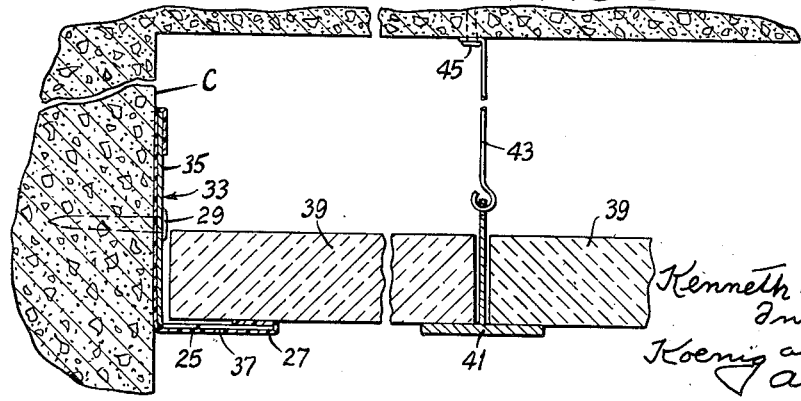
FIG. 5 is an enlarged cross section taken on line 5—5 of FIG. 4, illustrating application of the embodiment of FIG. 4.

Another embodiment of my invention is shown in FIGS. 4 and 5, and comprises an elongated bracket 33 having a flat back or web 35 and a plurality of tabs extending outward therefrom or what may be referred to as a flange 37 extending outward from one edge of the back with notches 25 therein. Plastic material 27 is adhered to at least the lower side of flange 37, and may extend from the upper side of the flange 37 around the lower side thereof, one side of back 35, and a portion of the other side of back 35. This form is useful when brackets 33 are used and a false ceiling is employed formed of acoustical blocks 39, rather than pans 1. The blocks are supported throughout most of a room by elongated and inverted T-members, one of which is shown at 41. These T-members are hung from the ceiling by hooks 43 which are attached to the ceiling at one end by nails 45, for example, and hooked on to the T-members at the other end. When a curved surface, such as a column, is encountered during the construction of a false ceiling using these acoustical blocks, the bracket 33 is cut from a length of molding and attached to the column with masonry nails, for example, in a manner similar to the attachment of bracket 17 to column C. The acoustical blocks are cut so that they will generally conform to the curvature of a column and placed so that they rest on flange 37 and a T-member 41.

While the molding as shown in the drawings as being used for supporting acoustical pans or blocks around a column, it will be understood that it may be used around any irregularly curved surface which does not have such a small radius of curvature as to cause notches 7 to open so widely as to exceed the elastic limit of the sheet 27.

It will thus be seen that this invention provides an inexpensive and practical way to install acoustical pans or blocks around any curved surface, without having to rely on preformed molding which may not accurately conform to the curved surface. Further, the molding presents a smooth unbroken good-looking surface on the lower flange.

It will be noted that an advantage of having the plastic material 27 folded over to envelop the margins of the channel members such as shown in FIGS. 1 and 4 is that the metal edges of the flanges are thereby trimmed. Moreover, both sets of notches 25 in the case of FIG. 1 are thus covered, so that the molding may be used with either flange up or down when attached to the column C.

In view of the above, it will be seen that the several objects of the invention are achieved and other advantageous results attained.

As various changes could be made in the above constructions without departing from the scope of the invention, it is intended that all matter continued in the above description or shown in the accompanying drawings shall be interpreted as illustrative and not in a limiting sense.

I claim:

1. In a building haivng an interior floor-to-ceiling concrete column, said column being generally circular in horizontal cross section, an elongate flexible metal strip having a thin manually bendable back and a thin flat flange extending generally perpendicularly from a margin of said back to form a supporting shelf generally at a right angle to the back, said flange having notches therein spaced along its length, and a thin layer of stretchable plastic material adhered to and completely covering the outside of said flange including the notches, said metal strip having its back applied to the perimeter of the column and bent around the column in a horizontal plane adjacent the upper end of the column and secured to the column in bent condition by fasteners driven into the column through said back, said flange projecting outward from the column at the lower margin of the back of the strip when so secured, said notches having been spread by said bending and said plastic material being stretched across the spread notches to cover and conceal the notches and to provide a substantially smooth unbroken and unobtrusive flat appearance to the underside of said flange, and a plurality of ceiling members having edge portions curved in substantial correspondence with the curvature of the perimeter of the column, the margins of said ceiling panels at said curved edge portions of said panels being entered over said flange and bearing upon the top face of said flange.

2. The construction specified in claim 1 wherein the layer of plastic material is folded around the outer edge of the notched flange and adhered to the inside of the flange and also folded over upon and adhered to the back of the strip.

3. The construction specified in claim 1 wherein the strip has a second thin flat flange extending generally perpendicularly from its other margin to form an upper shelf generally at a right angle to said back, said second flange having notches therein spaced along its length.

4. The construction specified in claim 3 wherein the layer of plastic material is folded around the outer edge of the notched lower flange and adhered to the inside of the latter, extends upward on and is adhered to the back of the strip, is folded over on and adhered to the top surface of the upper flange, and is folded around the outer edge of the upper flange and adhered to the inside of the latter.

References Cited in the file of this patent

UNITED STATES PATENTS

| | | |
|---|---|---|
| 1,876,519 | McKinney | Sept. 6, 1932 |
| 1,903,541 | Bailey | Apr. 11, 1933 |
| 2,981,386 | Reske et al. | Apr. 25, 1961 |

FOREIGN PATENTS

| | | |
|---|---|---|
| 1,041,960 | France | May 27, 1953 |